United States Patent
Liu et al.

(10) Patent No.: US 9,360,901 B2
(45) Date of Patent: Jun. 7, 2016

(54) RETAINING APPARATUS FOR HARD DISK DRIVE

(71) Applicant: ScienBiziP Consulting (Shen Zhen) Co., Ltd., Shenzhen (CN)

(72) Inventors: Lei Liu, Shenzhen (CN); Guo-Yi Chen, Shenzhen (CN)

(73) Assignee: ScienBiziP Consulting (Shenzhen) Co., Ltd., Shenzhen (CN)

(*) Notice: Subject to any disclaimer, the term of this patent is extended or adjusted under 35 U.S.C. 154(b) by 93 days.

(21) Appl. No.: 14/484,233

(22) Filed: Sep. 11, 2014

(65) Prior Publication Data

US 2015/0070831 A1    Mar. 12, 2015

(30) Foreign Application Priority Data

Sep. 11, 2013  (CN) .......................... 2013 1 0410752

(51) Int. Cl.
*G06F 1/18*      (2006.01)
*G11B 33/10*    (2006.01)
*G11B 33/12*    (2006.01)

(52) U.S. Cl.
CPC ............... *G06F 1/187* (2013.01); *G11B 33/10* (2013.01); *G11B 33/124* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,673,171 A * | 9/1997 | Varghese | ................ | G11B 33/08 248/615 |
| 6,431,718 B1 * | 8/2002 | Gamble | .................. | G06F 1/184 361/679.33 |
| 6,459,571 B1 * | 10/2002 | Carteau | ................... | G06F 1/184 312/35 |
| 6,636,426 B2 * | 10/2003 | Inman | ................... | G06F 1/1601 248/200 |
| 7,271,999 B2 * | 9/2007 | Rabinovitz | ........... | G11B 33/128 248/682 |
| 7,307,836 B2 * | 12/2007 | Scicluna | ................ | G11B 33/10 340/635 |
| 7,636,237 B2 * | 12/2009 | Cheung | ................... | G06F 1/187 361/679.37 |
| 8,566,545 B2 * | 10/2013 | Kurokawa | ............... | G06F 1/187 711/163 |
| 2002/0199048 A1 * | 12/2002 | Rabinovitz | .............. | G06F 1/181 710/100 |
| 2004/0095716 A1 * | 5/2004 | McAlister | ............... | G06F 1/187 361/679.33 |
| 2005/0041387 A1 * | 2/2005 | Lee | .......................... | G06F 1/16 361/679.33 |
| 2005/0213300 A1 * | 9/2005 | Tran | ........................ | G06F 1/181 361/679.4 |
| 2012/0147545 A1 * | 6/2012 | Niu | .......................... | G06F 1/187 361/679.31 |
| 2012/0162899 A1 * | 6/2012 | Wu | ....................... | G11B 33/124 361/679.33 |
| 2013/0049979 A1 * | 2/2013 | Li | ....................... | H05B 33/0806 340/815.4 |
| 2013/0128383 A1 * | 5/2013 | Wu | ........................ | G06F 11/325 360/79 |
| 2013/0132665 A1 * | 5/2013 | Wu | ....................... | G06F 3/0658 711/112 |

* cited by examiner

*Primary Examiner* — Lisa Lea Edmonds
(74) *Attorney, Agent, or Firm* — Novak Druce Connolly Bove + Quigg LLP

(57) ABSTRACT

A hard disk retaining apparatus includes a main body and an indicating module is installed inside the main body, the indicating module includes a display button, a trigger button, and a display unit. When the hard disk drive is installed into the main body, the hard disk drive contacts the trigger button, pressing the display button, the display unit can display if the hard disk drive is installed into the hard disk retaining apparatus. When the hard disk drive is not installed into the main body, the display unit does not work.

5 Claims, 4 Drawing Sheets

RETAINING APPARATUS FOR HARD DISK DRIVE

FIELD

Present disclosure relates to a retaining apparatus, and particularly to a hard disk drive retaining apparatus with an indication device.

BACKGROUND

Typically, a data storage device, such as a hard disk drive is installed to a computer enclosure with a retaining apparatus.

BRIEF DESCRIPTION OF THE DRAWINGS

Implementations of the present technology will now be described, by way of example only, with reference to the attached figures.

DETAILED DESCRIPTION

Figure 1:
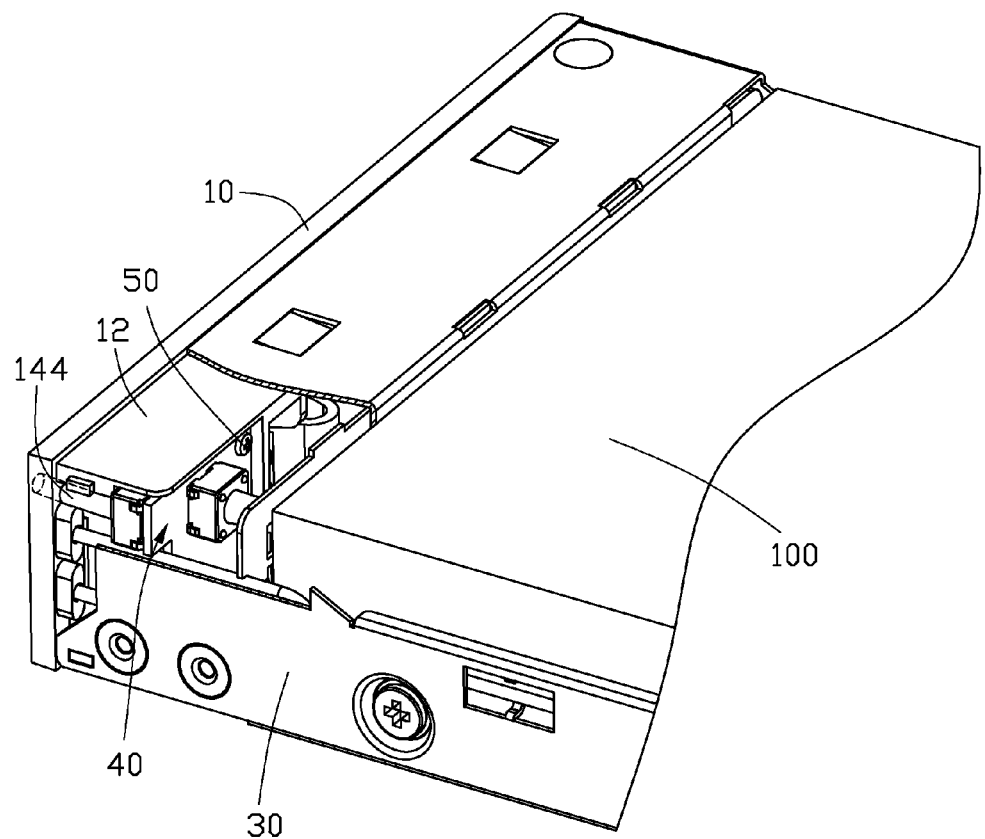
FIG. 1 is an isometric, partial view of a hard disk drive retaining apparatus according to an embodiment. The retaining apparatus includes an indicating module.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "outside" refers to a region that is beyond the outermost confines of a physical object. The term "inside" indicates that at least a portion of a region is partially contained within a boundary formed by the object. The term "comprising", when utilized, means "including, but not necessarily limited to"; it specifically indicates open-ended inclusion or membership in the so-described combination, group, series and the like.

Figure 2:
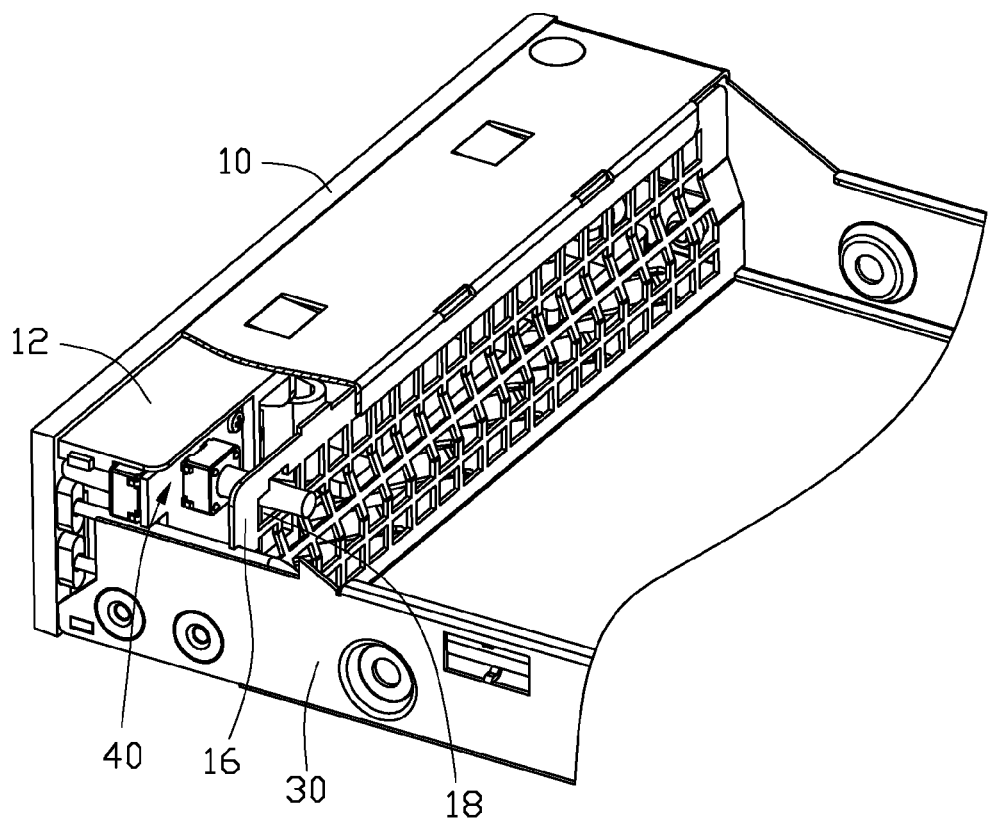
FIG. 2 is an isometric view of the hard disk retaining apparatus.

FIG. 1-2 illustrates a hard disk drive retaining apparatus of the present disclosure. The hard disk drive retaining apparatus is configured for retaining a hard disk drive 100. The hard disk drive retaining apparatus includes a main body 10, two lateral plates 30 extending from two ends of the main body 10, and an indicating module 40. A hard disk drive 100 is fixed between two lateral plates 30.

The main body 10 includes a frame 12, a mask plate 16 is fixed inside the frame 12, and the indicating module 40 is arranged between the frame 12 and the mask plate 16. The mask plate 16 defines a through hole 18.

Figure 3:
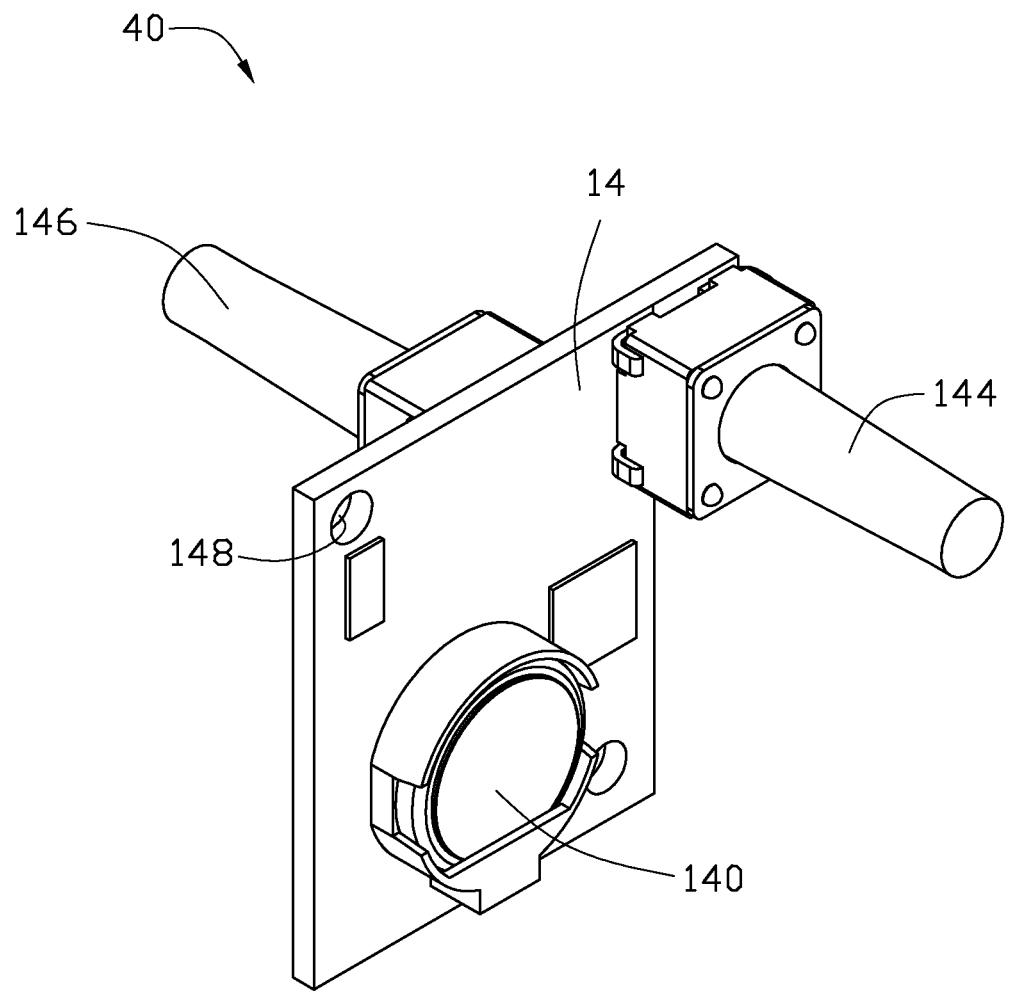
FIG. 3 is an isometric view of the indicating module of FIG. 1, but viewed from another angle.

FIG. 3 illustrates that the indicating module 40 includes a circuit board 14. A battery 140, a display button 144, and a trigger button 146 are installed on the circuit board 14. Two screw holes 148 are defined in two diagonally opposite corners of the circuit board 14; the circuit board 14 is screwed to the installation frame 12 via a screw 50 and the screw hole 148. The display button 144 and the trigger button 146 are located at opposite sides of the circuit board 14, wherein the display button 144 may be exposed outside the main body 10, the trigger button 146 extends toward one side of the mask plate 16 and passes through the through hole 18.

Figure 4:
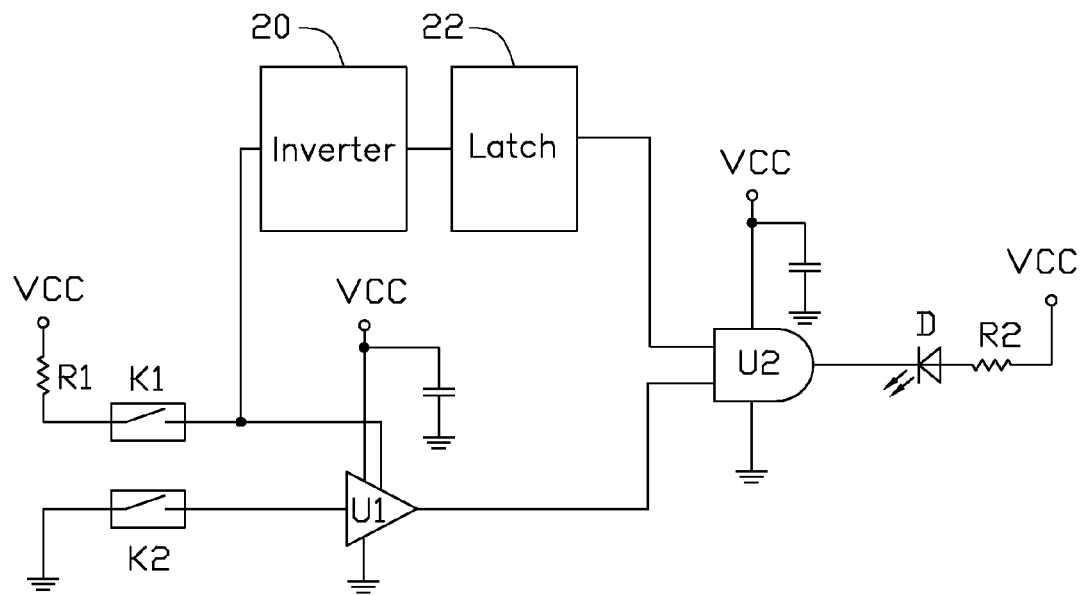
FIG. 4 is a circuit diagram of the indicating module of the retaining apparatus.

FIG. 4 illustrates a circuit diagram of the indicating module 40 of the retaining apparatus of the present disclosure, the indicating module 40 includes an electric power VCC, two resistors R1 and R2, two switches K1 and K2, an inverter 20, a latch 22, a buffer U1, a AND gate U2, and a display unit. In the present embodiment, the display unit is a light emitted diode (LED) D, wherein the electric power VCC is a battery 140, the switch K1 is controlled by the trigger button 146, the switch K2 is controlled by the display button 144, the LED D is arranged inside the display button 144, the display button 144 has light guide rod function.

One end of the switch K1 is connected to the electric power VCC via the resistance R1, the other end of the switch K1 is connected to a first input terminal via the inverter 20, the latch 22, and the AND gate U2. One end of the switch K2 is grounded, the other end of the switch K2 is connected to an input terminal of the buffer U1, the switch K1 controls the buffer U1, a output terminal of the buffer U1 is connected to a second input terminal of the AND gate U2. The output terminal of the AND gate U2 is connected to a cathode of the LED D, an anode of the LED D is connected to the electric power VCC via the resistance R2.

When the hard disk drive 100 is installed into the hard disk drive retaining apparatus, the hard disk drive 100 contacts with the trigger button 146 and then closes the switch K1, the input terminal of the inverter 20 is high-level (logic 1) voltage, the output terminal of the inverter 20 is low-level (logic 0) voltage, the control terminal of the buffer U1 is logic 1 voltage. The latch 22 may latch the logic 0 voltage for 3 seconds, the time can be preset, at this time the first input terminal of the AND gate U2 is logic 0. The second input terminal of the AND gate U2 is neutral, the output terminal of the AND gate U2 is logic 0, the LED D is forward conduction and emits light. After 3 seconds, the output terminal of the latch 22 is logic 1, that is the first input terminal of the AND gate U2 is logic 1, at this time the output terminal of the AND gate U2 is logic 1, the LED D is reverse cut-off and turns off the light. When the display button 144 is pressed, the switch K2 is then closed, the input terminal of the buffer U1 is logic 0, the buffer U1 is conducted, the output terminal of the buffer U1 is logic 0, and also the second input terminal of the AND gate U2 is logic 0, the output terminal of the AND gate U2 is logic 0, the LED D is forward conduction and emits light.

If the hard disk drive 100 is not installed into the hard disk drive retaining apparatus, the switch K1 is switched off, the control terminal of the buffer U1 is logic 0, the buffer U1 is not conducted, even though the display button 144 is pressed, the LED D cannot emit light.

The hard disk retaining apparatus includes the indicating module 40; thus, to determine if the hard disk drive 100 has been inserted into the hard disk drive retaining apparatus the display button 144 is pressed.

It is believed that the discussed embodiments and their advantages will be understood from the foregoing description, and it will be apparent that various changes may be made thereto without departing from the disclosure or sacrificing all of its material advantages. The embodiments discussed herein do not limit the following claims.

What is claimed is:

1. A hard disk drive retaining apparatus, comprising:
a main body;
an indicating module is set inside the main body and includes a display button, a trigger button, and a display unit;
wherein a hard disk drive is installed into the main body, the hard disk drive contacts the trigger button, then presses the display button, the display unit can display the hard disk drive is installed into the hard disk drive retaining apparatus; when the hard disk drive is not installed into the main body, the display unit is not worked.

2. The hard disk retaining apparatus of claim 1, wherein the display unit is a LED (light emitting diode), the indicating module includes a electric power, a first switch is controlled by the trigger button, a second switch is controlled by the display button, an inverter, a latch, a buffer, and an AND gate, one end of the first switch is connected to the electric power, the other end of the first switch is connected to a first input of the AND gate via the inverter and the latch, one end of the second switch is grounded, the other end of the second switch is connected to an input terminal of the buffer, a control terminal of the buffer is connected to the first switch, an output terminal of the buffer is connected to a second input terminal of the AND gate, output terminal of the AND gate is connected to a cathode of the LED, an anode of the LED is connected to the electric power, when the hard disk drive is installed into the main body, the first switch is closed, pressing the display button, the second switch is closed, the LED is conducted and emits light; when the hard disk drive is not installed into the main body, the first switch is opened, pressing the display button, the LED is not conducted.

3. The hard disk retaining apparatus of claim 2, wherein the first switch is connected to the electric power through a resistance.

4. The hard disk retaining apparatus of claim 2, wherein the anode of the LED is connected to the electric power through a resistance.

5. The hard disk retaining apparatus of claim 1, wherein the retaining apparatus includes two lateral plates extending from two ends of the main body, and the hard disk drive is fixed between two lateral plates.

* * * * *